Patented July 13, 1948

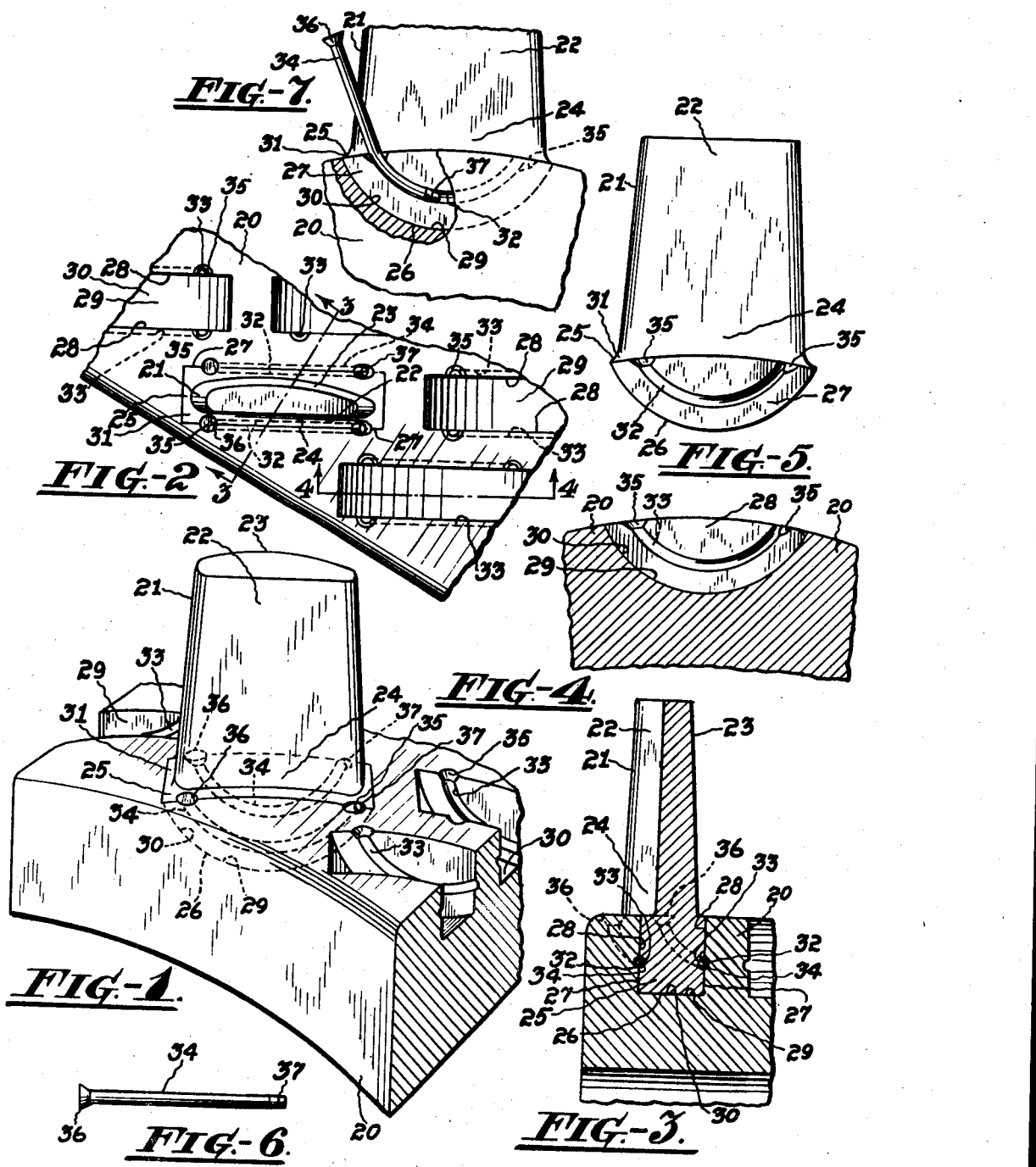

2,445,154

UNITED STATES PATENT OFFICE 2,445,154

BLADE MOUNTING

Robert H. Reed, Stewartsville, N. J., assignor to Ingersoll-Rand Company, New York, N. Y., a corporation of New Jersey Application March 4, 1944, Serial No. 524,998

3 Claims. (Cl. 230—134)

1

This invention relates to axial blowers and the like, and more particularly to a blade mounting for machines of this type.

One object of the invention is to avoid the undue weakening of the rotor of the blower through the forming therein of the spaces intended for the accommodation of the blades.

A more specific object is to provide individual recesses or slots in the peripheral surface of the rotor for the blades.

Another object is to enable the blades to be attached to the rotor in a simplified and improved manner.

A further object is to enable the blades to be quickly and conveniently attached to or disconnected from the rotor.

Still another object is to avoid the weakening of the root portion of the blade.

Another object is to permit of the ready replacement of a blade without disturbing the setting of adjacent blades.

Other objects will be in part obvious and in part pointed out hereinafter.

In the drawings accompanying this specification and in which similar reference numerals refer to similar parts, Figure 1 is a perspective view of a fragmentary portion of the rotor of an axial flow blower and a blade attached thereto in accordance with the practice of the invention, Figure 2 is a top plan view of Figure 1, Figure 3 is a transverse view taken through Figure 2 on the line 3—3, Figure 4 is a similar view taken through Figure 2 showing the conformation of a slot intended for the accommodation of the root portion of a blade and a groove in the side wall of the slot for the reception of a locking element serving to lock the blade to the rotor, Figure 5 is a side elevation of a blade, Figure 6 is a longitudinal side view of one form of locking element that may serve to lock the blade to the rotor, and Figure 7 is a side elevation, partly broken away, of a rotor having a blade seated therein and illustrating the manner in which the locking element may be placed in assembled position for locking the blade to the rotor.

Referring to the drawings, and at first more particularly to the form of the invention shown in Figures 1 to 7 inclusive, 20 designates a body which may be considered as being a fragmental portion of the drum or rotor of an axial flow blower, and 21 represents a blade attached to the body 20.

2

The blade 21 may, insofar as the impelling portion is concerned, be of a conventional form. It is shown as having a flat impelling side 22 and a convex trailing side 23 and the edges of the blade are suitably curved to merge into the sides 22 and 23. Preferably, the outer or free end of the blade is of less width than the base 24 of the blade so that, with the exception of the flat side 22, the blade is tapered toward its outer or free end.

At the base 24 is a root portion 25 of greater length and breadth than the base 24 and, as viewed from the top, of rectangular shape. The lower side surface 26 of the root portion 25 is of arcuate shape being described from a point lying above the root portion 25 and midway between the edges of the blade 21 so that the root portion is symmetrical about the longitudinal axis of the blade and the maximum depth of the root portion is less than a semi-circle. The root portion is of uniform width throughout and its opposed side surfaces 27 engage slidably the opposed walls 28 of a slot 29 in the peripheral surface of the body 20. The entrance to the slot, or slots, 29 lies entirely within the peripheral surface of the body. The slot 29 is shown as being of the same length as the root portion 25. It is of uniform width throughout and its bottom surface 30 is also of arcuate shape to conform substantially to the curvature of the surface 26 of the root portion so that when the latter is seated into a slot 29 thus shaped the opposed sides 27 of the root portion will be in substantial contact with the adjacent surfaces 28 of the slot and the arcuate surface 26 of the root portion will engage the entire surface 30 of the slot.

The upper surface 31 of the root portion is suitably curved to conform with the curvature of the peripheral surface of the body 20, and the slot 29 and the root portion 25 are of such dimensions that the surface 31 lies flush with the peripheral surface of the body.

Suitable means are provided for locking the blade 21 to the body 20, and to this end the opposed surfaces 27 and 28 are provided with registering grooves 32 and 33, respectively, to receive locking members 34. The grooves are of arcuate shape being described on a small radius than the bottom surfaces of the slot 29 and the root portion and are shown as being of partly circular cross sectional shape to receive a cylindrical locking member 34.

Preferably, both ends of the grooves 33 open into the peripheral surface of the body 20, and the grooves 32 likewise open at both ends in the surface 31 of the root portion so that a locking member 34 may be inserted into either end of the grooves, if desired.

The grooves 32 and 33 may, as shown, be formed on both side surfaces of the root portion and the slot to provide each blade with two locking members 34, and at their ends are depressions 35 to accommodate enlargements on the terminal portions of the locking member, as for example a head 36 at one end and a peened-over portion 37 at the other end of the locking member.

In the example shown, the locking member consists of a cylindrical rod that may be constructed of flexible material so that it will yield to the curvature of the grooves 32 and 33 when driven thereinto or, if desired, it may be pre-shaped to conform to the curvature of the grooves. In all cases its diameter should be such with respect to the aperture defined by the grooves 32 and 33 that the locking member will have a drive fit in the grooves in order to secure the blade fixedly to the body.

As is indicated in the drawings, the slots 29 may be arranged in circular rows around the periphery of the body 20 and positioned in a desired angular relationship with respect to the axial plane of the body. The adjacent rows of slots may be closely spaced, as indicated, or widely in structures in which rows of blades in the body alternate with rows of blades attached in the above described or other suitable manner to an encircling casing.

In assembling the blades 21 in the body 20 the root portion 25 of a blade is inserted into a slot 29. Locking members 34 are then driven into the grooves 32-33 until the head 36 seats in a depression 35. Thereafter, the opposite end of the locking member may be peened-over into the depression in the opposite ends of the grooves and the blade will thereby be securely fastened to the body.

In practice, the present invention has been found to be highly desirable for use in attaching blades to the rotors of axial flow blowers, and the like, operating at high speeds since it makes possible the mounting of the blades therein without localized weakening of the rotor. The rotor is provided with individual slots for the blades which may, therefore, be placed in assembled position or removed, when required, without disturbing adjacent blades. Moreover, by inserting each blade in an individual slot the peripheral portion of the rotor may remain uniformly strong nor is any part of the recess serving to accommodate a blade subjected to the wear occasioned by the repeated insertion of blades into and the moving thereof through a single slot as is the case in many structures of this type. The blades will, therefore, retain their initial fits within the slots indefinitely.

I claim:
1. A blade mounting for axial blowers and the like, comprising a body having a cylindrical surface and an arcuate slot of uniform width in the surface, a blade, a root portion of arcuate shape on the blade having a slide fit in the slot, there being registering arcuate grooves in the opposed surfaces of the root portion and the slot that open at both ends into the cylindrical surface, depressions in the cylindrical surface at the ends of the grooves, flexible means in the grooves and insertable into either end thereof, and means on the opposite ends of the first said means, that cooperate with said depressions for locking the blade to the body.

2. A blade mounting for axial blowers and the like, comprising a body having a cylindrical surface and an arcuate slot of uniform width throughout, a blade having a root portion shaped to conform with and to seat into the slot, there being registering arcuate grooves in the opposed surfaces of the root portion and the slot that open at both ends into the cylindrical surface, depressions in the cylindrical surface at the ends of the grooves, and flexible means in the grooves having heads on one end thereof that seat in the depressions and having the other ends upset in the depressions at the opposite ends of the grooves for locking the blade to the body.

3. A blade mounting for axial blowers and the like, comprising a cylindrical body having an arcuate slot the opening of which lies entirely within the periphery of said body, a blade having a root portion to conform with the shape of the slot and being symmetrical with the longitudinal axis of the blade, and flexible means embedded in the opposed side surfaces of the root portion and the slot for locking the root portion to the body.

ROBERT H. REED.

REFERENCES CITED

The following references are of record in the file of this patent:

UNITED STATES PATENTS

| Number | Name | Date |
| --- | --- | --- |
| 890,635 | Fox | June 16, 1908 |
| 901,228 | Collier | Oct. 13, 1908 |
| 1,085,325 | Cubelic | Jan. 27, 1914 |
| 1,423,466 | Snyder | July 18, 1922 |
| 1,535,417 | Huff | Apr. 28, 1925 |
| 1,793,468 | Densmore | Feb. 24, 1931 |
| 1,891,612 | Schmidt | Dec. 20, 1932 |
| 2,025,171 | Ljungstrom | Dec. 24, 1935 |

FOREIGN PATENTS

| Number | Country | Date |
| --- | --- | --- |
| 663,020 | France | Apr. 14, 1929 |